United States Patent [19]

Preston

[11] Patent Number: 5,164,089
[45] Date of Patent: Nov. 17, 1992

[54] AQUARIUM FILTER ASSEMBLY
[76] Inventor: Glen R. Preston, 14850 Kildare Ave., Midlothian, Ill. 60445
[21] Appl. No.: 492,900
[22] Filed: Mar. 13, 1990
[51] Int. Cl.⁵ ............................................. C02F 3/06
[52] U.S. Cl. .................................. 210/615; 210/629; 210/150; 210/169; 210/416.2; 210/461; 210/496; 119/5
[58] Field of Search ............... 210/150, 169, 416.2, 210/459, 461, 496, 510.1, 615, 629, 903, 460; 119/5

[56] References Cited
U.S. PATENT DOCUMENTS

| | | | |
|---|---|---|---|
| 610,527 | 9/1898 | Fischer | 210/461 |
| 897,418 | 9/1908 | Sheridan | 210/461 |
| 2,539,768 | 1/1951 | Anderson | 210/496 |
| 2,769,779 | 11/1956 | Vansteenkiste et al. | 210/169 |
| 3,301,402 | 1/1967 | Falkenberg et al. | 210/169 |
| 3,785,494 | 1/1974 | Sama | 210/459 |
| 3,865,729 | 2/1975 | Baensch | 210/169 |
| 3,899,424 | 8/1975 | Lake | 210/169 |
| 3,947,362 | 3/1976 | Etani | 210/416.2 |
| 4,265,751 | 5/1981 | Willinger | 210/416.2 |
| 4,620,924 | 11/1986 | Goldman et al. | 210/169 |
| 4,995,980 | 2/1991 | Jaubert | 210/615 |

FOREIGN PATENT DOCUMENTS 935820 12/1955 Fed. Rep. of Germany .
2749600 5/1979 Fed. Rep. of Germany .
3044376 6/1982 Fed. Rep. of Germany .

OTHER PUBLICATIONS

"The Biological Sponge", by Art Hayley, from Freshwater and Marine Aquaculture, vol. #1, 1978, pp. 33–37 and 81.

Primary Examiner—Stanley S. Silverman
Assistant Examiner—Christopher Upton

[57] ABSTRACT

An aquarium filter assembly (10) which comprises a filter body (12) made of an open celled foam material which supports a culture of aerobic bacteria which removes toxic ammonia from aquarium water in which it is immersed. The filter body (12) substantially defines a closed cavity (14) and a passageway (30) extends through the open celled foam material into cavity (14) for receipt therewithin of an aerator lift tube (32) of a cross sectional dimension substantially less than that of the cavity (14) leaving open space in the cavity (14) and to draw aquarium water therefrom to cause aquarium water to freely flow into the open space of the cavity substantially uniform through the entire amount of open celled foam material of the filter body (12). The aquarium filter assembly also includes a means for mounting (43) the filter body (12) within the aquarium but spaced from interior surfaces thereof to permit unobstructed flow through substantially the entire filter body (12). Further, including a method to do the same.

15 Claims, 2 Drawing Sheets

AQUARIUM FILTER ASSEMBLY

SUMMARY OF THE INVENTION

This invention relates to an aquarium filter assembly and, more specifically, to an aquarium filter assembly of the type with a filter body for supporting a culture of aerobic bacteria for removing toxic ammonia from aquarium water.

Ammonia at toxic levels is the number one cause of mortality and poor health of small fish maintained in closed system aquariums. Ammonia is produced by the decay of unavoidable organic matter in the tank, such as excrement and uneaten food. This ammonification process is, thus, unavoidable. It is well known to prevent ammonia build-up to toxic levels by means of a filter medium which supports a colony of beneficial nitrosomonas bacteria and nitrobacter bacteria. These aerobic bacteria convert the ammonia to nitrous oxide and molecular nitrogen gas which are automatically released from the water.

Successful maintenance of these beneficial bacteria requires a continuous flow of aquarium water through the medium that supports them. Disadvantageously, however, the known biological filters employ various solid shapes of open-cell foam which are mounted directly against lift tube inlets. This precludes continuous flow through substantially the entire filter medium but, instead, restricts the water to flow through only the portions of the filter body adjacent the inlets. The bacteria colonies that can be supported by these known filters are therefore often limited to a size too small to be efficient.

Examples of such known filter structures, but without a biological filter medium, are shown in U.S. Pat. No. 3,947,362 issued Mar. 30, 1976, to Etani, U.S. Pat. No. 2,539,768, issued Jan. 30, 1951, to Anderson and U.S. Pat. No. 3,865,729 issued Feb. 11, 1975, to Baensch. Similar structures are also known in which a flexible, open celled foam, biological filter medium is employed.

A cylindrical body with a hollow core is employed in the filter assembly shown in U.S. Pat. No. 3,301,402 issued Jan. 31, 1967, of Falkenberg et al., but the filter medium is a nonbiologic, solid, self-supporting filter in which significant portions are blocked against flow by being pressed directly against a mounting cap and base.

A biological filter mechanism is used in the aquarium filter shown in U.S. Pat. No. 2,769,779 issued Nov. 5, 1956, of Vansteenkiste et al., but, again, free unobstructed flow through substantially the entire filter body is obstructed partially, if not entirely, by sand or the like in which the filter is completely or partially buried.

Apparatus, including suction cups, have been used to mount filter mounting mechanisms away from the bottom or sides of the aquarium, but again, the filter mounting mechanisms themselves have prevented unobstructed flow through substantially the entire filter body, since the suction cups have been mounted to bases which block flow through significant parts of the filter medium and have not been connected directly to the filter body of open celled foam material, itself.

SUMMARY OF THE INVENTION

Thus, it is also an object to provide a method of filtering an aquarium comprising the steps of providing a filter assembly made substantially entirely of foamed, open celled biological filter medium with a cavity and substantially confined by walls of substantially uniform thickness, and mounting the filter assembly to an inside wall of an aquarium at a location spaced therefrom by legs attached directly to the foamed filter medium.

It is therefore an object of the present invention to provide an aquarium filter assembly with a biological filter of open celled foam material with a culture of aerobic bacteria for removing toxic ammonia from aquarium water caused by decay of organic material and in which the aforementioned problems and disadvantages of known filter assemblies are overcome by provision of a closed cavity in a filter defined substantially entirely by an open celled foam material filter body and means for mounting the filter body within the aquarium to prevent unobstructed flow through substantially the entire filter body.

A structure is provided which causes the aquarium water to freely flow into the open space of the cavity substantially uniformly through the entire amount of the open celled foam material of the entire filter body. This substantially reduces the amount of foam material needed for a given amount of filtering since virtually the entire filter is used. A passageway extends through the open celled foam material into the cavity for receipt therewithin of an aerator lift tube of a cross sectional dimension less than that of the cavity to leave open space in the cavity for drawing aquarium water therefrom to cause aquarium water to freely flow into the open space of the cavity substantially uniformly through the entire amount of open celled foam of the filter body, and means are provided for mounting the filter body within the aquarium but spaced from interior surfaces thereof to permit unobstructed flow through substantially the entire filter body.

In keeping with the objective of maximizing the efficient use of the filter material, an aquarium filter assembly is provided with a hollow filter body and means for releasibly, directly attaching the filter body to an inside planar wall of an aquarium including a mounting member attached directly to the filter body.

In order to reduce blockage of filter material, the mounting member is attached to the filter body by button-like members at one end and to suction cups at the other end.

BRIEF DESCRIPTION OF THE DRAWINGS

The foregoing objects, advantages and features of the invention will be described in greater detail and further objects, advantages and features will be made apparent from the detailed description of the preferred embodiment which is given with reference to the several figures of the drawing, in which.

DETAILED DESCRIPTION

Figure 1:
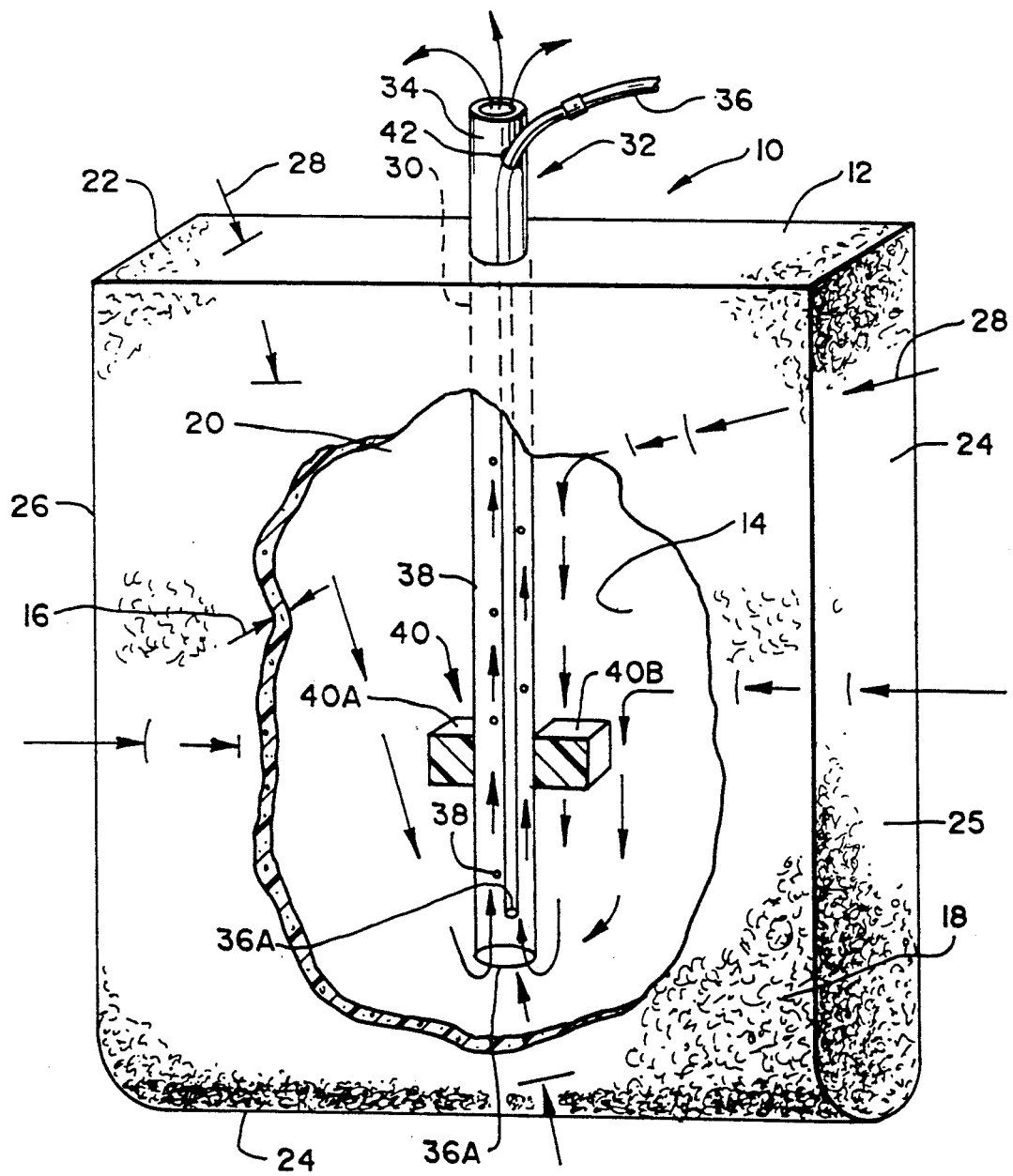
FIG. 1 is a perspective view of a preferred embodiment of the aquarium filter assembly of the present invention with portions thereof broken away to illustrate the interior closed cavity and lift tube contained therein.

Referring now to the drawings, the preferred embodiment of the aquarium filter assembly 10 is seen to include a substantially planar filter body 12 made of open celled foam material, such as polyester or polyurethane, which supports a culture of aerobic bacteria, such as nitrosamonas and nitrobacter bacteria (not shown). These bacteria convert the ammonia formed by decay of organic matter to nitrous oxide or molecular nitrogen before it reaches toxic levels damaging to the fish.

Figure 3:
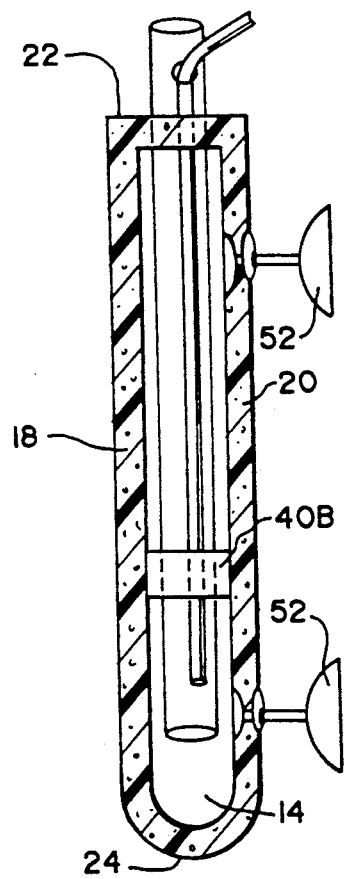
FIG. 3 is an enlarged sectional side view of the aquarium filter assembly of FIG. 1.
Figure 4:
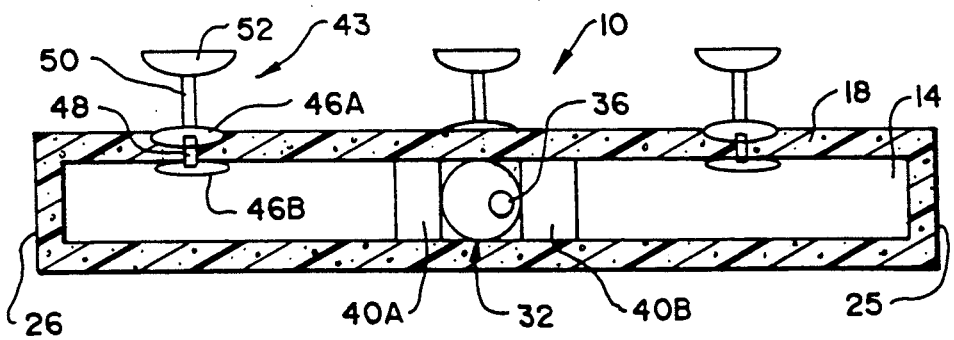
FIG. 4 is an enlarged sectional side view of the aquarium filter assembly of FIG. 1.

Maintenance of the viability of these beneficial bacteria requires a continuous flow of aquarium water through the filter body 12. Accordingly, a closed cavity 14, best seen in FIGS. 3 and 4, is provided in the filter body 12 which is substantially congruent to the substantially planar shape of the filter body 12. This enables provision of a substantially equal uniform wall thickness 16 for the front wall 18, of back wall 20, the top wall 22, the bottom wall 24 and the opposite side walls 25 and 26. All the walls except the curved bottom wall 24 are planar. The uniform thickness 18 assists in achieving the objective of substantially uniform flow of water, indicated by arrows 28, through all of the walls.

A passageway 30 extends through the open celled foam material of the top wall 22 into the cavity 14 for receipt therewithin of an aerator lift tube assembly 32. The lift tube assembly 32 includes a lift tube 34 and an aerator tube 36 which extends downwardly through the lift tube to inject air bubbles 38 through its distal end 36A into the lift tube 34 adjacent its distal end 36A. The air bubbles 38 rise up the lift tube 34 which causes water within the cavity 14 to be drawn into the open end 36A, up the lift tube 36 and then out of tube 36 for return to the aquarium. This, in turn, causes the aquarium water 28 on the outside of the cavity 14 to be substantially uniformly drawn through the uniform walls 18, 20, 22, 24, 25 and 26 into the cavity 14 and, then, ultimately into the open end 36A of the fill tube 36 for recirculation.

The use of a single passageway 30 for both the lift tube 34 and the aerator tube 36 maximizes the available filter area compared to units which employ separate passageways. In addition, the juncture 42 when the aerator tube 36 exits the side of lift tube 34 is located above top wall 22, so the aerator tube 36 blocks excessive downward movement of the tube 34.

In keeping with one aspect of the invention, the cross sectional dimension of the aerator lift tube assembly 32 is substantially less than that of the cavity 14 to leave open space in the cavity 14. The opening 36 is less likely to become clogged, and flow through the filter body 12 is not concentrated at the location of the inlet 36A as known filters of this type in which the inlets of the lift tube are in direct contact with the filter medium.

A holder assembly 40 is provided within the cavity 14 for holding the aerator lift tube assembly 36 aligned with the passageway 30. Preferably, it is formed by a pair of holding elements 40A and 40B secured to at least one of back wall 20 and front wall 18. An intermediate section of the lift tube 34 is held therebetween against lateral movement.

Preferably, the aerator tube 34 is pressed sufficiently tightly between the blocks 40A and 40B so that it is also restrained against longitudinal movement to hold the open end 36A above the bottom wall 24 to preclude concentrated flow through the bottom wall 24. The curve of the bottom wall 24 also ensures that even if the planar end 36A of tube 34 were to be pressed into engagement with the curved bottom 24, there would still be free access to the end 36A from within the cavity 14. Preferably, the blocks 40A and 40B are integrally formed of the same resilient, open celled foam material as the filter body 12.

As best seen in FIG. 3, the blocks 40A and 40B of the holder assembly 40 function to provide structural rigidity to the planar filter body 12 to prevent collapse of the cavity 14 by inward movement of the back wall 20 and the front wall 18. This, combined with the uniform wall thickness and substantially planar shape, advantageously enables making substantially the entire filter assembly 10 of open celled filter material and eliminating the use of various holders which block water flow through significant parts of the filter body 12 into the cavity 14.

Figure 2:
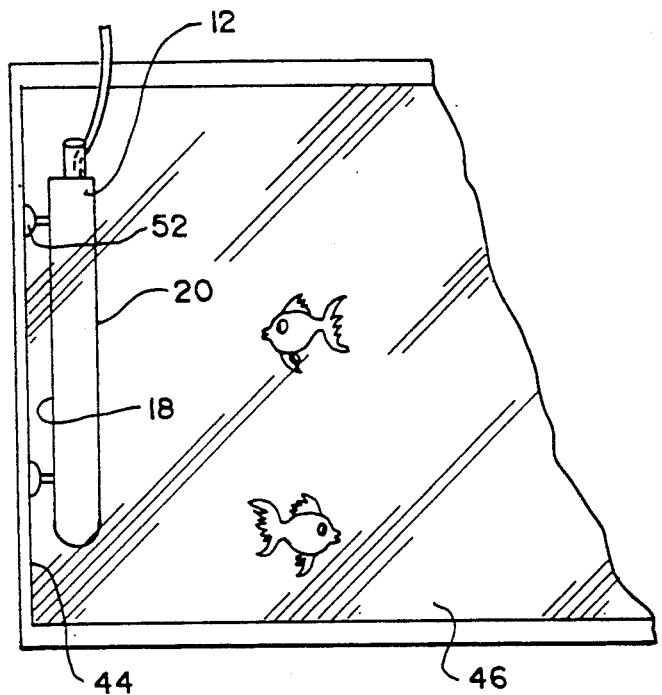
FIG. 2 is a side view of an aquarium with the aqurium filter assembly of the present invention mounted to a wall thereof.

Referring particularly to FIG. 2, achievement of another object of the aquarium filter assembly 10 is through provision of a mounting assembly 43, which mounts the filter body 12 spaced from interior surfaces of the aquarium 46 and permits substantially unobstructed flow of aquarium water through the entire filter body 12. In this embodiment, the assembly shown here releasibly attaches the filter body 12 of open celled foam material directly to a planar wall 44 of an aquarium 46 directly. This embodiment is also referred to as a releasable, directly attaching means. This direct mounting is instead of indirect mounting through means of an intermediate base to which the filter body is mounted and which blocks flow through a substantial part of the filter body.

Referring to FIG. 4, in the preferred embodiment, the mounting assembly 43 includes button-like members 46A and 46B which hold an insignificant portion of the back wall therebetween with a connecting rod 48 of lesser cross section than the button-like members 46A and 46B passing through a matching bore in the back wall 18. The connecting rod 48 has a leg 50 extending axially therefrom which is releasibly mounted to a suction cup 52.

In the preferred embodiment in which the filter body 12 is planar, the three direct attachment mechanisms 43 are arranged to form an isoseles triangle. The triangle insures mounting all three suction cups 52 to a plane, and the legs 50 are of sufficient length to insure the spacing from the side wall 44 is sufficient for unobstructed uniform flow through all sides of the filter body 12.

There are many other mounting assemblies 43 which are contemplated by this invention which would keep the filter body 12 spaced from the interior surfaces of the aquarium and permit unobstructed flow through substantially the entire filter body 12. Some of these would be to provide a mechanism which would hang the filter body 12 suspended in the aquarium water or even provide legs to hold the filter body 12 in a suspended posture, as well. These are merely a couple of examples of mounting the filter body 12 in the desired manner. However, these are but a few, as should be appreciated, of many variations that can be made without departing from the scope of the claims.

While a particular embodiment has been disclosed, it should be appreciated that many variations may be made thereto without departing from the scope of the invention as set forth in the appended claims.

I claim:

1. An aquarium filter assembly, comprising:
    a filter body having exterior and interior walls of open celled foam material supporting a culture of aerobic bacteria for removing toxic ammonia from aquarium water in which it is immersed;
    a cavity in the filter body defined by the open celled foam material of the interior walls of the filter body;
    an aerator lift tube;
    a passageway extending through the open celled foam material into the cavity for receipt therewith of the aerator lift tube such that upon insertion of the aerator lift tube into the passageway the interior walls of the cavity are enclosed except for the aerator lift tube and where the aerator lift tube is of a cross sectional dimension substantially less than that of the cavity to leave open space in the cavity and for drawing aquarium water therefrom to cause aquarium water to freely flow into the open space of the cavity substantially uniformly through the entire amount of open celled foam material of the filter body; and
    means for mounting the filter body within the aquarium but spaced from the interior surfaces thereof to permit unobstructed flow through substantially the entire filter body.

2. The aquarium filter assembly of claim 1 including means within the interior of the cavity for holding the aerator lift tube against lateral movement.

3. The aquarium filter assembly of claim 2 in which holding means is made of the open celled foam material of the filter body.

4. The aquarium filter assembly of claim 1 in which
    said body is in the general shape of a substantially rectangular plate, and
    said cavity comprises a substantially rectangular envelope which is substantially congruent with the rectangular plate shape of the body to provide walls of substantially uniform thickness.

5. The aquarium filter assembly of claim 4 in which said mounting means is attached directly to the open celled foam material of the filter body to releasibly attach the rectangular filter body to the inside wall of an aquarium with the rectangular body substantially uniformly spaced therefrom.

6. The aquarium filter assembly of claim 5 in which said mounting means includes a suction cup connected to one rectangular wall of the filter body by an elongate leg.

7. The aquarium filter assembly of claim 1 in which the open celled foam material is flexible but has walls of sufficient stiffness to maintain its structural integrity independently of any nonfiltering structural elements.

8. The aquarium filter assembly of claim 1 in which the open celled foam material is at least one of foamed polyurethane and polyester.

9. An aquarium filter assembly comprising:
    an aerator lift tube;
    a hollow filter body having a cavity and a body having exterior and interior walls made of open celled foam material in which the cavity is defined by the interior walls and in which the body has a passageway for receipt of the aerator lift tube into the cavity such that upon insertion of the aerator lift tube into the passageway the interior walls of the cavity are enclosed except for the aerator lift tube and in which the cross sectional dimension of the cavity is larger than that of the passageway; and
    means for releasably, directly attaching the filter to an inside planar wall of an aquarium but spaced therefrom including a mounting member attached directly to the filter body.

10. The aquarium filter assembly of claim 9 in which said releasibly attaching means includes suction cups, and
    means directly attached to the filter body for coupling to the suction cups.

11. The aquarium filter assembly of claim 10 in which said coupling means includes
    a pair of spaced apart button-like members attached to a connecting rod in which the connecting rod passes through the walls of the filter body and each button-like member is disposed on either side of the wall squeezing the wall therebetween.

12. The aquarium filter assembly of claim 11 in which said coupling means includes
    three suctions cups and three legs for interconnecting the three suction cups with three pairs of button-like members, respectively.

13. The aquarium filter assembly of claim 12 in which said three suction cups are arranged at the corners of an imaginary isosceles triangle.

14. The aquarium filter assembly of claim 11 in which said releasible coupling means includes means for releasibly coupling the suction cups to the button-like members.

15. A method of filtering water of an aquarium comprising the steps of:
    providing a filter assembly having exterior and interior walls of foamed, open celled biological filter medium defining a cavity and wherein the walls are of substantially uniform thickness in which an aerator lift tube is placed into a passageway of the walls thereby enclosing the cavity except for the aerator lift tube and in which the cross sectional area of the cavity is greater than the cross sectional area of the lift tube;
    mounting the filter assembly to an inside wall of an aquarium at a location spaced therefrom by legs attached directly to the foamed filter medium providing unblocked flow through the foamed filter medium to the enclosed cavity; and
    reducing the water pressure inside the cavity causing aquarium water to migrate into the walls of the filter in which the walls support aerobic bacteria for removal of toxic ammonia from the aquarium water.

* * * * *

UNITED STATES PATENT AND TRADEMARK OFFICE
CERTIFICATE OF CORRECTION

PATENT NO. : 5,164,089

DATED : November 17, 1992

INVENTOR(S) : Glen R. Preston

It is certified that error appears in the above-identified patent and that said Letters Patent is hereby corrected as shown below:

Col. 1, line 3, delete "SUMMARY" and replace with --BACKGROUND--

Signed and Sealed this

Seventh Day of June, 1994

BRUCE LEHMAN

*Attest:*

*Attesting Officer*    Commissioner of Patents and Trademarks